(12) United States Patent
Attarwala et al.

(10) Patent No.: US 8,699,485 B2
(45) Date of Patent: Apr. 15, 2014

(54) MULTICAST OVER LAG AND IRB IN A ROUTING DEVICE

(75) Inventors: Murtuza Attarwala, San Francisco, CA (US); Nitin Kumar, Fremont, CA (US); Alok Khambatkone, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 438 days.

(21) Appl. No.: 12/770,052

(22) Filed: Apr. 29, 2010

(65) Prior Publication Data

US 2011/0268115 A1 Nov. 3, 2011

(51) Int. Cl.
*H04L 12/28* (2006.01)
(52) U.S. Cl.
CPC ..................................... *H04L 12/28* (2013.01)
USPC ........................................ 370/390; 719/327
(58) Field of Classification Search
USPC ................. 370/390, 235.1; 719/327
See application file for complete search history.

(56) References Cited

U.S. PATENT DOCUMENTS

| | | | | |
|---|---|---|---|---|
| 7,826,369 | B2 * | 11/2010 | Filsfils et al. | 370/235 |
| 7,903,554 | B1 * | 3/2011 | Manur et al. | 370/230.1 |
| 2005/0078602 | A1 * | 4/2005 | Mancour et al. | 370/230 |
| 2009/0196181 | A1 * | 8/2009 | Retana et al. | 370/235.1 |
| 2011/0258641 | A1 * | 10/2011 | Armstrong et al. | 719/327 |

* cited by examiner

*Primary Examiner* — Wei Zhao
(74) *Attorney, Agent, or Firm* — Harrity & Harrity, LLP

(57) ABSTRACT

Techniques for handling multicast over link aggregated (LAG) interfaces and integrated routing and bridging (IRB) interfaces in a network device are described in which interfaces, at which a data unit is to be transmitted, may be represented hierarchically in which the LAG interfaces and IRB interfaces are represented as pointers. In one implementation, a device may determine routes for data units, where a route for a multicast data unit is represented as a set of interfaces of the device at which the data unit is to be output. Entries in the set of interfaces may include physical interfaces of the device and pointers to LAG interfaces or pointers to the IRB interfaces. The device may generate tokens to represent routes for data units and resolve the pointers to the LAG interfaces or the IRB interfaces to obtain physical interfaces of the router corresponding to a LAG or an IRB.

20 Claims, 10 Drawing Sheets

MULTICAST OVER LAG AND IRB IN A ROUTING DEVICE

BACKGROUND

Computing and communication networks typically include devices, such as routers, switches or gateways, which transfer or switch data, such as packets, from one or more sources to one or more destinations. A network switch or router, in particular, may include a networking device that connects network segments and computing devices.

Traffic through a network, such as an Internet Protocol (IP) based packet switching network, may be transmitted as unicast traffic, where a unicast transmission refers to the sending of messages to a single network destination. Another type of transmission, multicast transmission, refers to simultaneously sending messages to a group of destinations. In multicast transmissions, it is desirable to send the multicast messages using an efficient delivery strategy that creates copies of the multicast messages only when the links to the multiple destinations split. IP multicast technologies are frequently used to stream multimedia to a number of clients.

Network switching and/or routing devices may control the flow of packets, such as unicast or multicast packet traffic, in a network. In some network topologies, links from switches/routers may be logically combined to appear as a single "virtual" aggregated link in the network.

Two issues faced by devices that handle multicast traffic over aggregated links include (1) load balancing the multicast traffic over the member links of the aggregated link switches and (2) handling failure instances in which a member link of an aggregated link fails. In some existing routers, load balancing is handled by creating "tokens" that represent routes, where an aggregated link that includes n (where n is an integer) member links may result in the creation of n tokens that are distributed to various components in the router.

It is desirable to be able to efficiently handle load balancing for multicast traffic over aggregated links in a way that allows for fast convergence when member links of an aggregated link fails and that efficiently uses memory of the routing/switching device.

SUMMARY

In one implementation, a network device may include multiple interfaces associated with communication links through which the network device communicates, where the network device may transmit data units over the multiple interfaces. The network device may further include a forwarding engine. The forwarding engine may include interface lookup logic to lookup routes for the data units, where a route is represented as a set of interfaces and where the set of interfaces includes a hierarchical representation in which link aggregations (LAGs) in the set of interfaces are represented by pointers to selectors for the LAGs. The forwarding engine may additionally include selection logic, including the selectors for the LAGs, to select, in response to the interface lookup logic looking up a route that includes a LAG, a single interface from among a number of member interfaces corresponding to the LAG and transmission logic to transmit the data units at the set of interfaces corresponding to the looked-up route.

In another implementation, a method may include routing network traffic that includes multicast traffic; determining routes for data units received by a router, where a route for a multicast data unit is represented by the router as a set of interfaces of the router at which the data unit is to be output. Entries in the set of interfaces may include physical interfaces of the router and pointers to LAG interfaces or pointers to integrated bridging and routing (IRB) interfaces. The method may further include generating a token to represent a route for a data unit and looking up, for each received data unit, the set of interfaces corresponding to the token, where looking up the set of interfaces includes resolving the pointers to the LAG interfaces or IRB interfaces to obtain physical interfaces of the router corresponding to the LAG or IRB. The method may further include transmitting the received data units at the corresponding looked-up set of interfaces.

In another possible implementation, a network device may include a switch fabric and a number of forwarding engines. Each of the forwarding engines may connect to the switch fabric and may include logic to determine routes for multicast data units received by the network device. A route for a multicast data unit may be represented as a set of interfaces of the network device at which the data unit is to be output. Entries in the set of interfaces may include physical interfaces of the network device and pointers to LAG interfaces or pointers to IRB interfaces. The network device may further include logic to generate a token representing the set of interfaces for the multicast data unit; logic to transmit the token over the switch fabric to another one of the forwarding engines; logic to lookup the set of interfaces corresponding to the token, where looking up the set of interfaces includes resolving the pointers to the LAG interfaces or IRB interfaces to obtain physical interfaces of the network device corresponding to the LAG or IRB; and logic to transmit the multicast data unit based on the looked-up set of interfaces.

BRIEF DESCRIPTION OF THE DRAWINGS

The accompanying drawings, which are incorporated in and constitute a part of this specification, illustrate one or more implementations described here and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Techniques for handling multicast over link aggregated (LAG) interfaces and integrated routing and bridging (IRB) interfaces are described herein. Interfaces, at which a data unit is to be transmitted, may be represented hierarchically in which the aggregated interfaces and IRB interfaces are represented as pointers that refer to a structure that defines the aggregated interface or IRB interface. Advantageously, changes to the aggregated interfaces can be handled by updating the pointed-to structure.

System Overview

Figure 1:
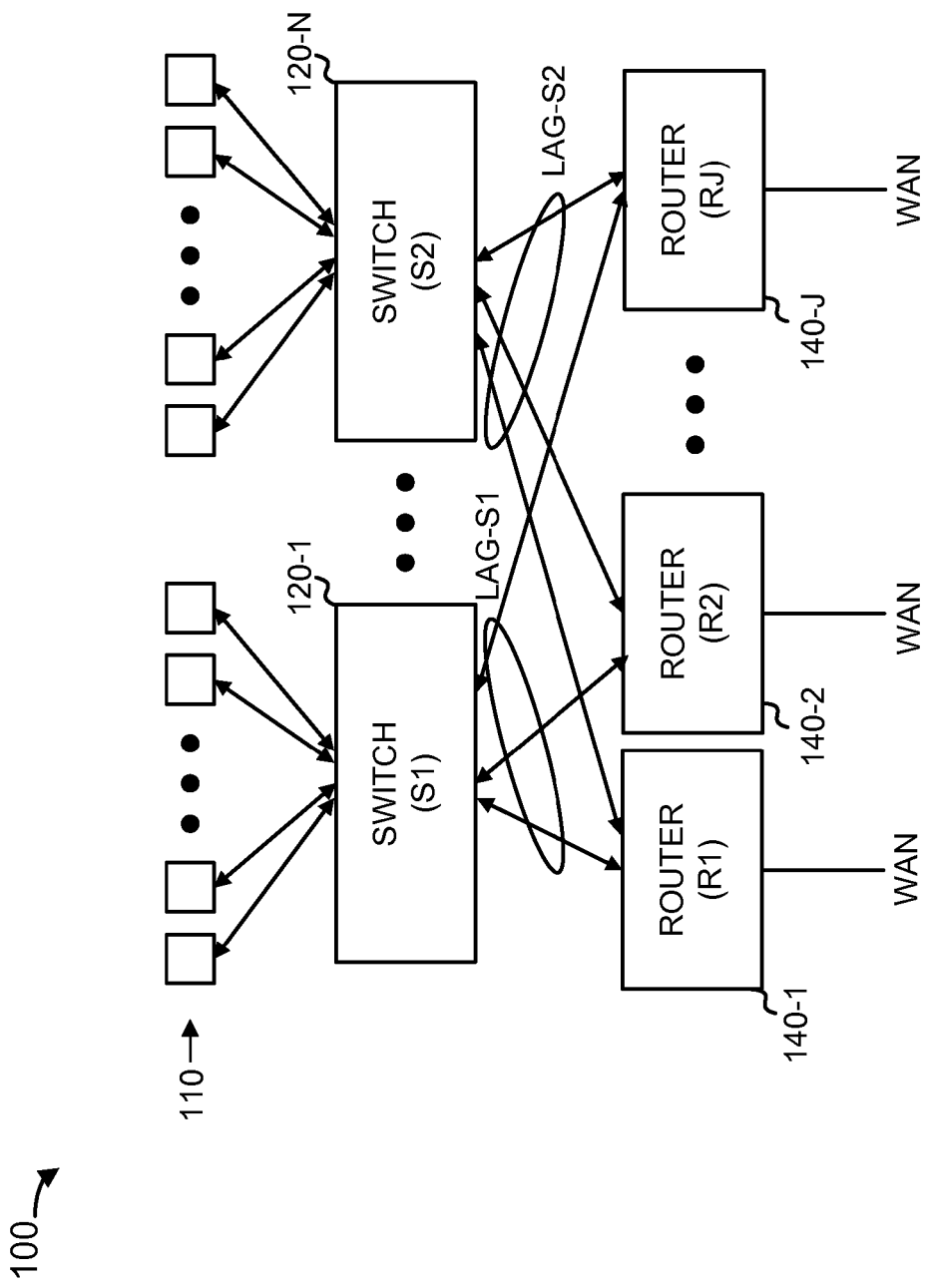
FIG. 1 is a diagram of an example of a system in which concepts described herein may be implemented.

FIG. 1 is a diagram of an example of a system 100 in which concepts described herein may be implemented. System 100 may include a switching/routing system connected to a number of client computing or networking devices 110. Each device 110 may be for example, a client or server computing device, or a network device such as a gateway to another network. The number or locations of devices 110 may be such that a single switch may not be able to feasibly service all of devices 110. Accordingly, system 100 may include a number of switches 120-1 through 120-N (collectively, switches 120) which may further connect to a number of routers 140-1 through 140-J (collectively, routers 140). Routers 140 may additionally connect to, for example, a wide area network (WAN), such as the Internet.

Switches 120 may be switches designed to connect to computing devices, such as devices 110. In one implementation, each switch 120 may include, for example, forty-eight (48) ports designed to connect to devices 110. Each switch 120 may also include a number of ports, such as eight, to connect to upstream devices, such as routers 140. The upstream ports to routers 140 may support higher bandwidth links than the links to devices 110.

Routers 140 may include network devices that can implement both routing and switching functions. One or more of routers 140 may also act as a gateway to a WAN or to another network. Routers 140 may be configured in a redundant configuration, such as multiple routers implementing the Virtual Router Redundancy Protocol (VRRP). VRRP is a protocol designed to increase the availability of network devices.

In one implementation, each switch 120 may be connected (linked) to each router 140. Multiple links from a switch 120 may be logically combined through link aggregation to form a single logical aggregated link (LAG). Aggregated links are shown in FIG. 1 as LAG-S1 (the links from switch 120-1) and LAG-S2 (the links from switch 120-N). For each switch 120, its corresponding LAG may be a logical link that includes a number of member links. The member links for LAG-S1, for example, may include S1R1, S1R2, and S1RJ. From the point of view of switch 120-1, links S1R1, S1R2, and S1RJ are encapsulated as the single link LAG-S1. When a data unit is destined for a logical link, the switch may select one of the members of the logical link over which the data unit is actually sent.

Although FIG. 1 illustrates switches 120 and routers 140, in some implementations, a router may be designed to function as both a switch and a router. Similarly, a switch may perform routing functions.

Figure 2:
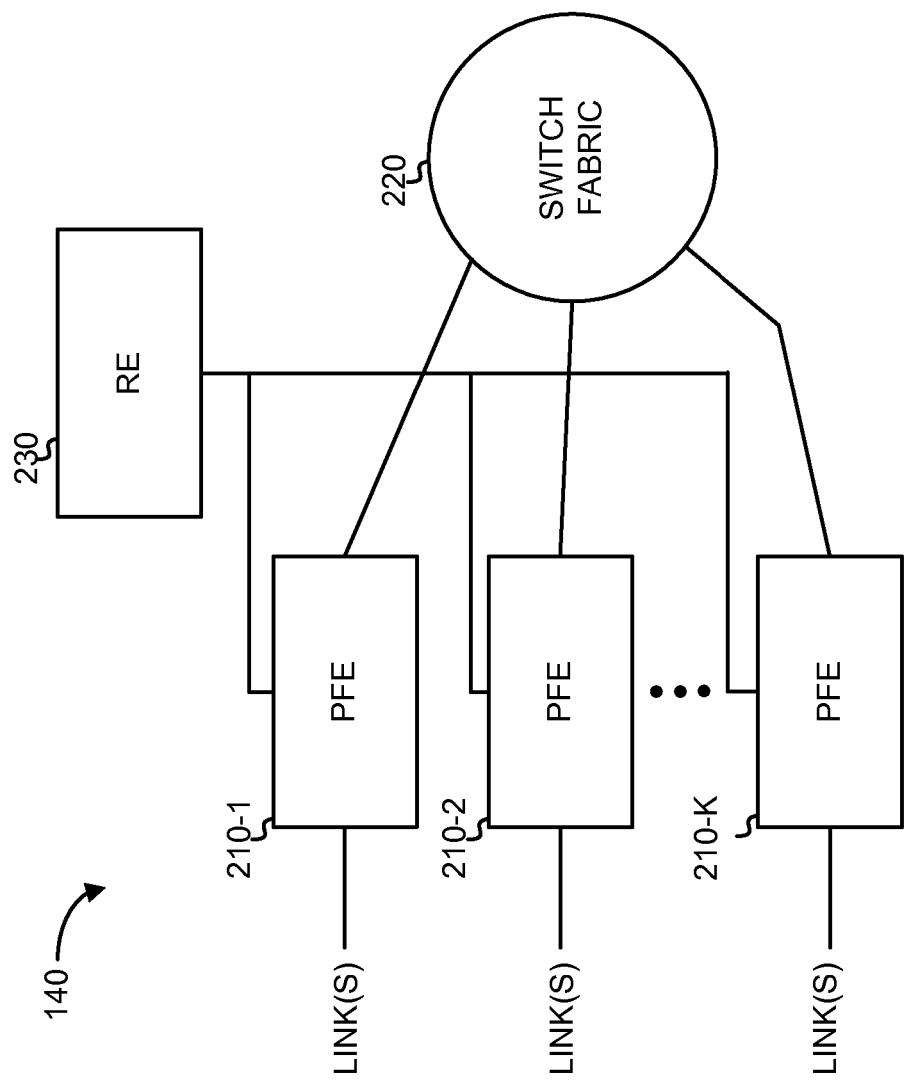
FIG. 2 is a diagram illustrating an example of an implementation of a device shown in FIG. 1.

FIG. 2 is a diagram illustrating an example of an implementation of a device shown in FIG. 1, such as one of routers 140. Router 140 may receive data streams from physical links, process the data streams to determine destination information, and transmit the data streams out on links in accordance with the destination information. As shown in FIG. 2, router 140 may include packet forwarding engines (PFEs) 210-1 through 210-K (collectively, PFEs 210), a switch fabric 220, and a routing engine (RE) 230.

Each PFE 210 may be connected to RE 230 and switch fabric 220. PFEs 210 may receive data units, such as data packets, at interfaces on physical links connected to a network, such as a wide area network (WAN) or a local area network (LAN). Each physical link could be one of many types of transport media, such as optical fiber or Ethernet cable. The data on the physical link may be formatted according to one of several protocols, such as the synchronous optical network (SONET) standard or Ethernet.

PFEs 210 may, for each received data unit, process a header of the data unit to determine an appropriate output interface for the data unit. In some situations, a single physical link may be associated with multiple interfaces. PFEs 210 may modify the header of the received data units before transmitting the data unit to the determined interface. Some received data units may be forwarded to an output interface connected to the PFE at which the data unit arrived. Other data units may be forwarded, via switch fabric 220, to other PFEs 210 in router 140 for transmission at the determined output interface.

Switch fabric 220 may be a switching component designed to allow efficient communication between PFEs 210. For instance, switch fabric 220 may be a hardwired non-blocking minimal spanning switch capable of connecting N inputs to N outputs in any combination.

RE 230 may perform high level management functions for router 103. For example, RE 230 may communicate with other networks and network devices connected to router 103 to exchange information regarding network topology and to implement routing protocols. RE 230 may create routing tables based on network topology information and forwarding tables based on the routing tables. The forwarding tables may be used by PFEs 210 to perform route lookup for incoming data units. RE 230 may also perform other general control and monitoring functions for router 103.

Although FIG. 2 illustrates example of a components of a router 140, in other implementations, router 140 may include additional, fewer, different, or differently arranged components than those illustrated in FIG. 2 and described herein. Moreover, one or more components shown in FIG. 2 may perform one or more tasks described herein as being performed by another component.

Multicast Over Lag

Consistent with aspects described herein, PFEs 210 of a router 140 may determine the forwarding path for received data units using indirection (i.e., multi-level hierarchical lookup) in the forwarding logic. The indirection in the forwarding logic may be particularly beneficial when handling multicast traffic over LAG, as it may provide for load balancing of the multicast traffic while conserving entries in nexthop lookup tables stored at PFEs 210 and providing fast convergence when member links of a LAG fail.

Multicast, as used herein, refers to IP multicast technologies in which data can be sent to a group of destinations simultaneously using an efficient delivery strategy in which copies of data units are made when links to different destinations split.

Figure 3:
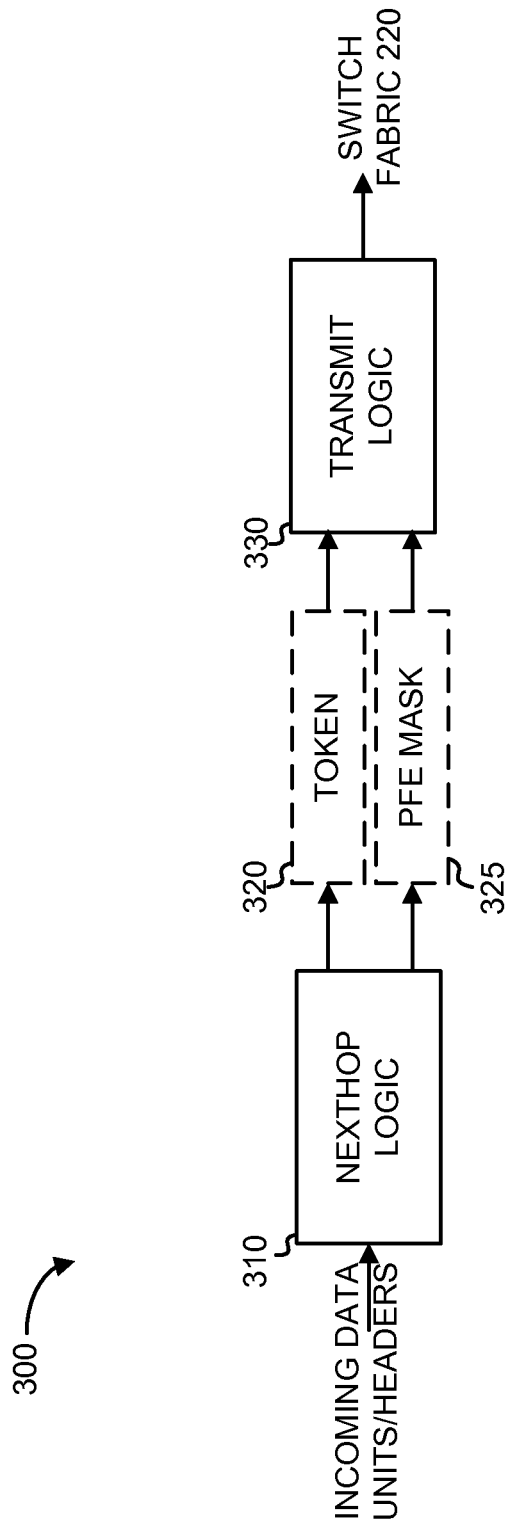
FIG. 3 is a diagram illustrating an example of functional components relating to the forwarding plane of an ingress forwarding engine.

FIG. 3 is a diagram illustrating example of functional components 300 relating to the forwarding plane of an ingress PFE 210. Although PFEs 210 may be referred to as "ingress" and "egress" PFEs herein, referring to whether a data unit is incoming from an external link or outgoing to an external link, in practice, each PFE 210 may act as both ingress and egress PFEs.

Components 300 may include nexthop logic 310 and transmit logic 330. Nexthop logic 310 may receive data units or data unit headers corresponding to ingress data units. Nexthop logic 310 may generate a nexthop token 320 and a PFE mask 325. Nexthop token 320 may be an internal data structure used by router 140 to represent a route for a data unit. Token 320 may be determined based on a longest prefix match (LPF) performed by nexthop logic 310. A single token may correspond to more than one outgoing interface of router 140. Token 320 may thus represent a number of interfaces, possible at one or more different PFEs 210, from which the data unit is to be sent. As will be described in more detail below, token 320 may also include references to LAGs. Each token 320 may be a label or index that may be used by PFEs 210 to lookup the outgoing interfaces for the corresponding data unit. In this manner, token 320 may be a relatively small structure that can be communicated among PFEs 210 to inform the PFEs of the outgoing interfaces for the data unit.

PFE mask 325 may include a mask representing each of the PFEs in router 140 that should receive the data unit. A data unit may need to be transmitted from multiple interfaces, potentially located at different PFEs 210, of router 140. PFE mask 325 may be set by nexthop logic 310 to represent each of PFEs 210 that should receive the data unit. PFE mask 325 may be, for example, a 64-bit mask in which each bit may represent a PFE.

Transmit logic 330 may transmit token 320 over switch fabric 220 to each of PFEs 210 indicated by PFE mask 325. In one implementation, token 320 may be transmitted as a label, such as a 21-bit label, that represents the set of interfaces to which the data unit is to be output. In addition to the token, transmit logic 330 may transmit other information, such as the data unit itself, over switch fabric 220 to each of PFEs 210 indicated by PFE mask 325.

Although FIG. 3 illustrates an example of components of the forwarding plane of an ingress PFE 210, in other implementations, the forwarding plane may include additional, fewer, different, or differently arranged functional components than those illustrated in FIG. 3 and described herein. Moreover, one or more functional components shown in FIG. 3 may perform one or more tasks described herein as being performed by another functional component.

Figure 4:
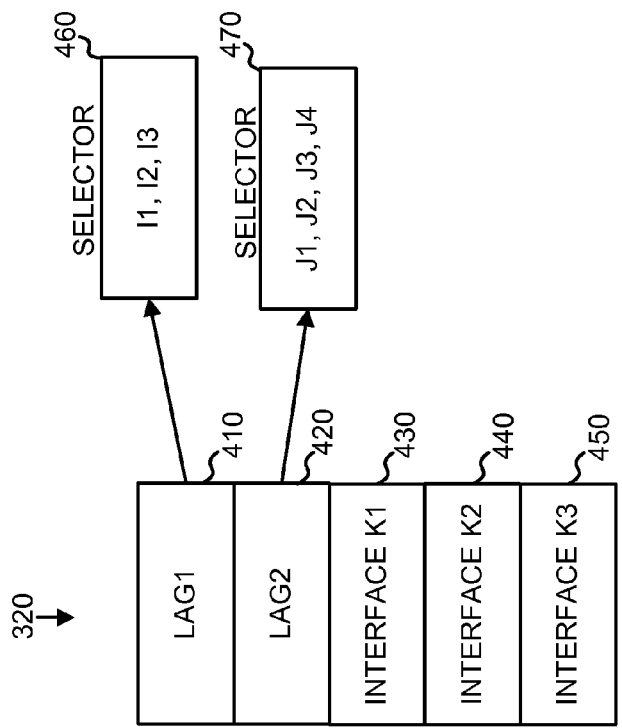
FIG. 4 is a diagram representing a set of interfaces corresponding to an example token.

FIG. 4 is a diagram representing a set of interfaces corresponding to an example of a token, such as token 320. In the example of FIG. 4, assume that token 320 represents a route that includes five interfaces. Two of the interfaces are interfaces that are LAGS: LAG1 410 and LAG2.420. The other interfaces are "normal" (non-aggregated) interfaces labeled as k1.430, k2.440, and k3.450.

In one implementation, each LAG interface in token 320 may refer to a particular "selector" that is used to select one of the member interfaces of the LAG. Two selectors, selector 460 and selector 470, are particularly shown in FIG. 4. Selectors 460 and 470 may include hardware and/or software designed to select one interface from the interfaces assigned to the selector. As shown, selector 460 is assigned the interfaces labeled i1, i2, and i3; and selector 470 is assigned the interfaces labeled j1, j2, j3, and j4. The interfaces assigned to selectors 460 and 470 may be the member interfaces of LAG1.410 and LAG2 420, respectively. Selectors 460 and 470 may be stored as references corresponding to the LAG entries of the set of interfaces referenced by token 320. Accordingly, with selectors 460 and 470, the set of interfaces corresponding to token 320 are defined using a multi-level structure that uses indirection.

In operation, selectors 460 and 470 may select one of its particular member interfaces based on, for example, a hash of a header portion of an incoming data unit (such as a source field, a destination field, other fields, or a combination of fields). Other techniques for selecting one of the member interfaces by a selector may alternatively be implemented. The technique used to select the member interface may be deterministic based on the data unit, so that selectors for a particular LAG at any of PFEs 210 will select the same interface for the particular data unit.

Figure 5:
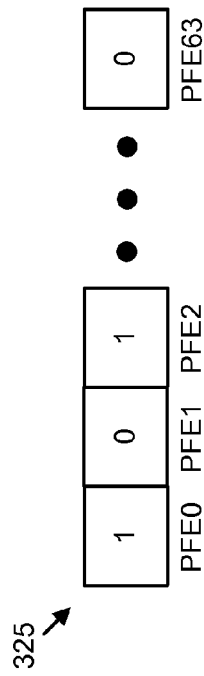
FIG. 5 is a diagram illustrating an example of a forwarding engine mask.

FIG. 5 is a diagram illustrating a PFE mask 325. PFE mask 325 may include a number of bits, where each bit may correspond to a PFE. A 64-bit mask is illustrated, where each bit corresponds to a particular PFE, labeled as PFE0 through PFE63. For the token shown in FIG. 4, assume that interfaces k1, k2, k3, i1, and j1 are on PFE0; interfaces i2 and j2 are on PFE1; and interfaces i3, j3, and j4 are on PFE2. In this situation, the bit for PFE0 will be set by nexthop logic 310 for the data unit as interfaces k1, k2, and k3 are physical non-LAG interfaces to which the data unit will be sent. The bit for PFE1 would be set by nexthop logic 310 if either i2 or j2 are active interfaces, that is, if either selector 460 or 470 selects one of these interfaces. Similarly, the bit for PFE2 would be set by nexthop logic 310 if either i3, j3, or j4 are active interfaces, that is, if either selector 460 or 470 selects one of these interfaces. In this example, the bit for PFE2 is shown as set while the bit for PFE1 is not set, indicating that neither interface i2 nor j2 was selected by selectors 460 and 470 but at least one of interfaces i3, j3, j4 are selected by selectors 460 and 470.

Figure 6:
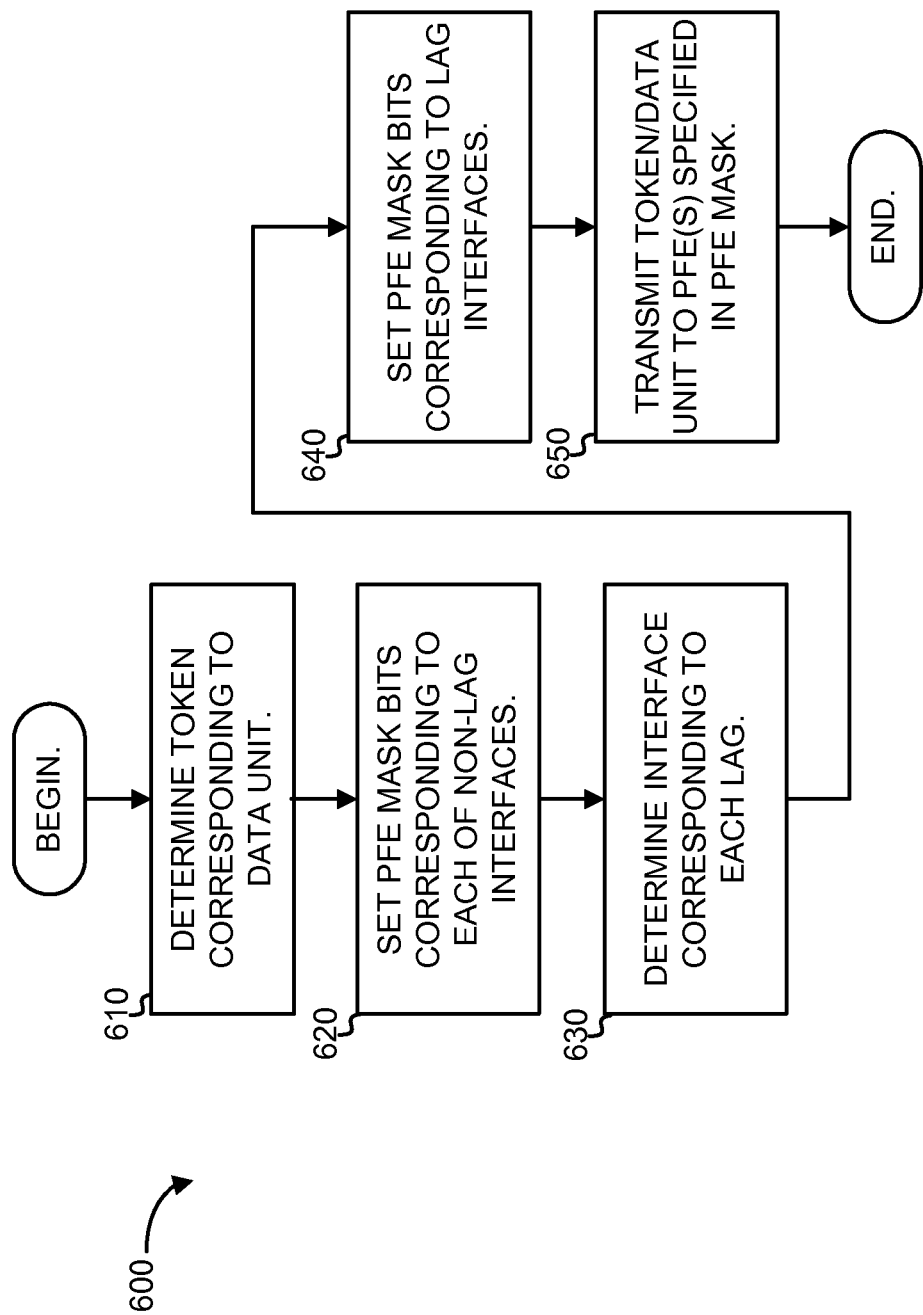
FIG. 6 is a flow chart illustrating an example of a process that may be performed by an ingress forwarding engine.

FIG. 6 is a flow chart illustrating a process 600 that may be performed by an ingress PFE.

Process 600 may include, for each incoming data unit, determining a token corresponding to the data unit (block 610). As previously mentioned, a token, such as token 320, may correspond to a representation of a route or routes for the data unit, represented as a set of interfaces at which the data unit is to be output. For a multicast data unit, the token may represent multiple interfaces in router 140 at which the data unit is to be output. Each PFE 210 in router 140 may store a lookup table that stores the set of interfaces corresponding to each token. A token may then be used as an index into the lookup table to determine the interfaces for the data unit. In this implementation, when, in block 610, a token is determined that is already in the lookup table, the lookup table does not need to be modified. When, however, a token is determined that is not already in the lookup table, the lookup table of each PFE may be updated to reflect the new set of interfaces.

Process 600 may further include setting PFE mask bits of each non-LAG interface corresponding to the determined token (block 620). For a non-LAG interface, such as interfaces k1.430, k2.440, and k3.450, the bit corresponding to the PFE that implements each of the interfaces may be set in PFE mask 325.

Process 600 may further include determining the interface corresponding to each LAG of token 320 (block 630). As previously mentioned, for a group of LAG interfaces, one of the interfaces may be selected for each data unit. The interface corresponding to each LAG that is selected for a particular data unit may be selected based on a hash performed on fields of the data unit. Selectors, such as selectors 460 and 470, may perform the selection.

Process 600 may further include setting PFE mask bits of each LAG interface (block 640). Because a particular interface was determined for each LAG (block 630), the mask bit of the PFE corresponding to the particular interface can be set.

Process 600 may further include transmitting the token and/or the data unit to each of the PFEs that are set in the PFE mask bit (block 650). The transmission may be over switch fabric 220. In this manner, data units may be transmitted to the PFEs at which the data units are to be sent. By transmitting a token that describes the route of the data unit, the destination PFE may not need to re-perform a longest prefix match lookup for the data unit.

FIG. 6 illustrates an example of operations in process 600. In other implementations, the process may include additional, fewer, different, or differently ordered operations than those illustrated in FIG. 6 and described herein.

Forwarding of a data unit through an egress PFE will now be described with reference to FIGS. 7-9.

Figure 7:
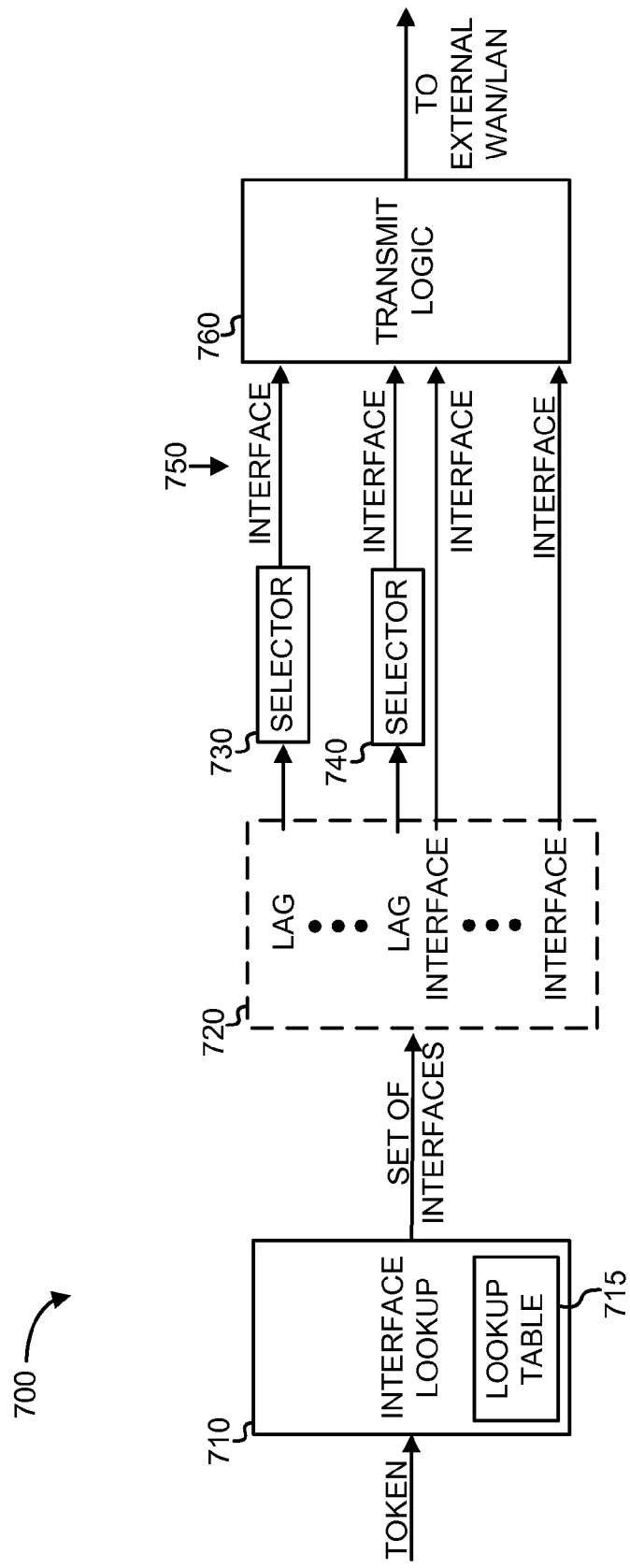
FIG. 7 is a diagram illustrating an example of functional components relating to the forwarding plane of an egress forwarding engine.

FIG. 7 is a diagram illustrating functional components 700 relating to the forwarding plane of an egress PFE. Functional components 700 may include an interface lookup component 710 that may receive a token from another PFE 210 over switch fabric 220. The output of interface lookup component 710 may include a set of interfaces 720 which, based on the operation of one or more selectors, may be converted to a list of interfaces 750. The data unit may be output from router 140 by transmit logic 760 for each of the interfaces in list of interfaces 750.

Interface lookup component 710 may store a route, such as a set of interfaces 720, for each possible token in a lookup table 715. Interface lookup component 710 may use the input token to lookup the route (e.g., set of interfaces 720) corresponding to the input token from lookup table 715. In one implementation, the input token may be an index into lookup table 715.

Set of interfaces 720 may include all of the interfaces, corresponding to the token, that are located on PFE 210. LAGs in set of interfaces 720 may be represented as a reference to (i.e., a pointer to) a selector corresponding to the LAG. Two selectors, selectors 730 and 740, are particularly illustrated in FIG. 7, corresponding to two LAGs in set of interfaces 720. Each selector may include logic to select one member interface from its corresponding LAG. The pointers to the selectors from set of interfaces 720 may thus be resolved by calling the selector referenced by the pointer. Set of interfaces 720, after processing by selectors 730 and 740, may include a final list of interfaces 750 from which the data unit will be output at the PFE.

Transmit logic 760 may include logic to transmit the data unit corresponding to the token on outgoing physical links of router 140 that correspond to each of the interfaces in list of interfaces 750.

Although FIG. 7 illustrates exemplary functional components of the forwarding plane of an egress PFE, in other implementations, the forwarding plane may include additional, fewer, different, or differently arranged components than those illustrated in FIG. 7 and described herein. Moreover, one or more functional components shown in FIG. 7 may perform one or more tasks described herein as being performed by another functional component.

Figure 8:
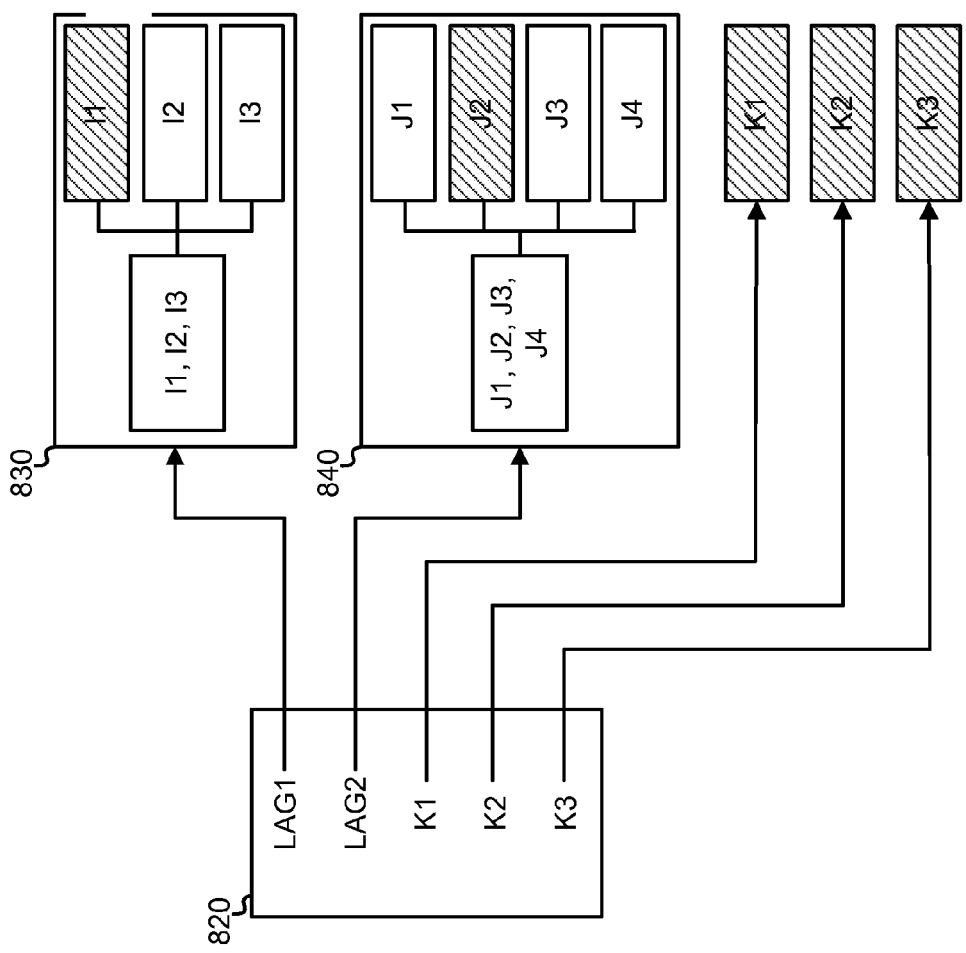
FIG. 8 is a diagram conceptually illustrating processing of a set of interfaces by an egress forwarding engine.

FIG. 8 is a diagram conceptually illustrating processing of a set of interfaces by an egress PFE. Assume that set of interfaces 820 is received from interface lookup component 710 and include the interfaces: LAG1, LAG2, k1, k2, and k3. Assume, for FIG. 8, that the egress PFE includes each of the interfaces i1, i2, i3, j1, j2, j3, j4, k1, k2, and k3.

The aggregated interfaces, LAG1 and LAG2, may be further processed by selectors 830 and 840 to obtain a single member interface. As previously mentioned, selectors, such as selectors 830 and 840, may select one of its member interfaces based on a hash of the fields of the data unit. Because the hash is performed on the same fields as that done by the selector in the ingress PFE, the selected interface will be the same as that performed in the ingress PFE. In this example, assume that selectors 830 and 840 select interfaces i1 and j2, respectively. Interfaces over which the data unit will be transmitted are shown with cross-hatching in FIG. 8. As shown, the egress PFE may transmit the data unit at interfaces i1, j2, k1, k2, and k3.

Figure 9:
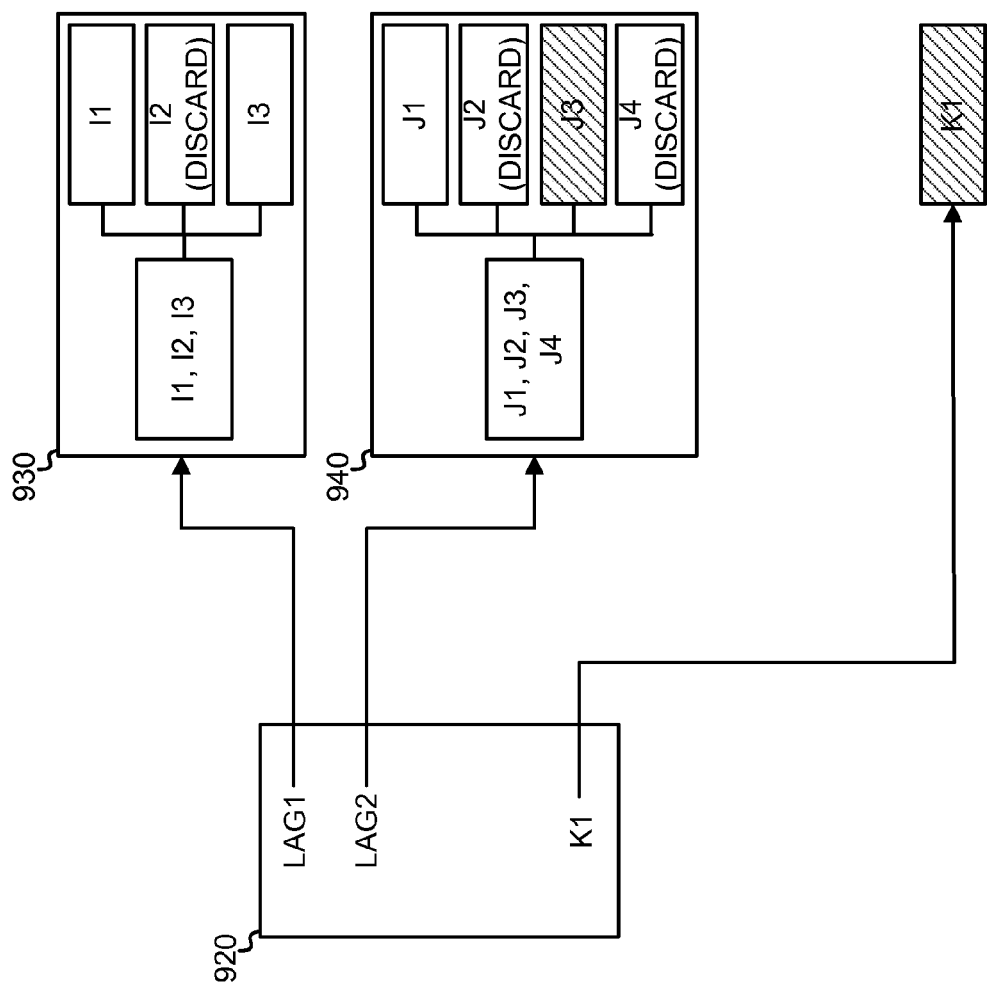
FIG. 9 is a diagram conceptually illustrating processing a set of interfaces by another egress forwarding engine.

FIG. 9 is a diagram conceptually illustrating processing a set of interfaces by another egress PFE. In this example, assume that the egress PFE includes less than all of the complete set of interfaces illustrated in FIG. 8. In particular, assume that the egress PFE shown in FIG. 9 includes the interfaces i1, i3, j1, j3, and k1 (i.e., i2, j2, j4, k1 and k2 are located on one or more other PFEs). In this case, set of interfaces 920, which was looked-up in interface lookup component 710 based on the received token, may not include the non-LAG interfaces (k2 and k3) that are not present at the egress PFE. Thus, set of interfaces 920 may include the interfaces: LAG1, LAG2, and k1.

The aggregated interfaces, LAG1 and LAG2, may be further processed by selectors 930 and 940 to obtain a single member interface. Although interfaces i2, j2, and j4 are not present at the egress PFE, the selection function performed (e.g., a hash) by selectors 930 and 940 may still select these member interfaces. In this case, the data unit may be dropped by the PFE (DISCARD) for this interface. In this example, assume that selectors 930 and 940 select, based on a hash of the data unit, interfaces i2 and j3, respectively. Because interface i2 is not on the egress PFE, the data unit will not be sent by the PFE over interface i2. However, because LAG1 contains interfaces that are present on the PFE (i.e., interfaces i1 and i3) and because the data unit may still be delivered to the PFE even when i2 is selected (due to k1 and j3 being selected), selector 930 will still operate to obtain the appropriate member interface (i2) but will not transmit the data unit. Thus, LAG1 may still need to be represented in set of interfaces 920 because the egress PFE includes interfaces (i1 and i3) in the LAG. Interfaces over which the data unit will be transmitted are shown shaded in FIG. 9. As shown, the egress PFE may transmit the data unit at interfaces j3 and k1.

Forwarding multicast data units over LAG using hierarchical set of interfaces, as described above, can provide a number of advantageous. For instance, when the membership of a LAG changes, such as due to a link failure, the lookup table implemented by interface lookup component 710 does not need to be modified. Instead, the membership of the corresponding selector may need to be modified, potentially leading to faster convergence during LAG membership changes. Additionally, by performing LAG load balancing in-line by the selectors, space in the lookup table implemented by interface lookup component 710 can be reduced relative to techniques that write multiple entries to the lookup table to implement a LAG.

Multicast Over IRB

As previously described, data units were processed in the forwarding plane using a multi-level hierarchical forwarding technique that is particularly useful for aggregated links. In addition to LAG interfaces, some routing devices may implement integrated routing and bridging (IRB) interfaces. IRB allows a routing device to both route and bridge a protocol.

Router 140 may handle IRB in a manner similar to the way in which LAG interfaces are handled. In general, a set of interfaces for a multicast route may include an IRB entry. The IRB entry may point to a structure that includes the member interfaces corresponding to the IRB. Under IRB, each of the member interfaces for the IRB may correspond to an interface at which the data unit should be transmitted.

Figure 10:
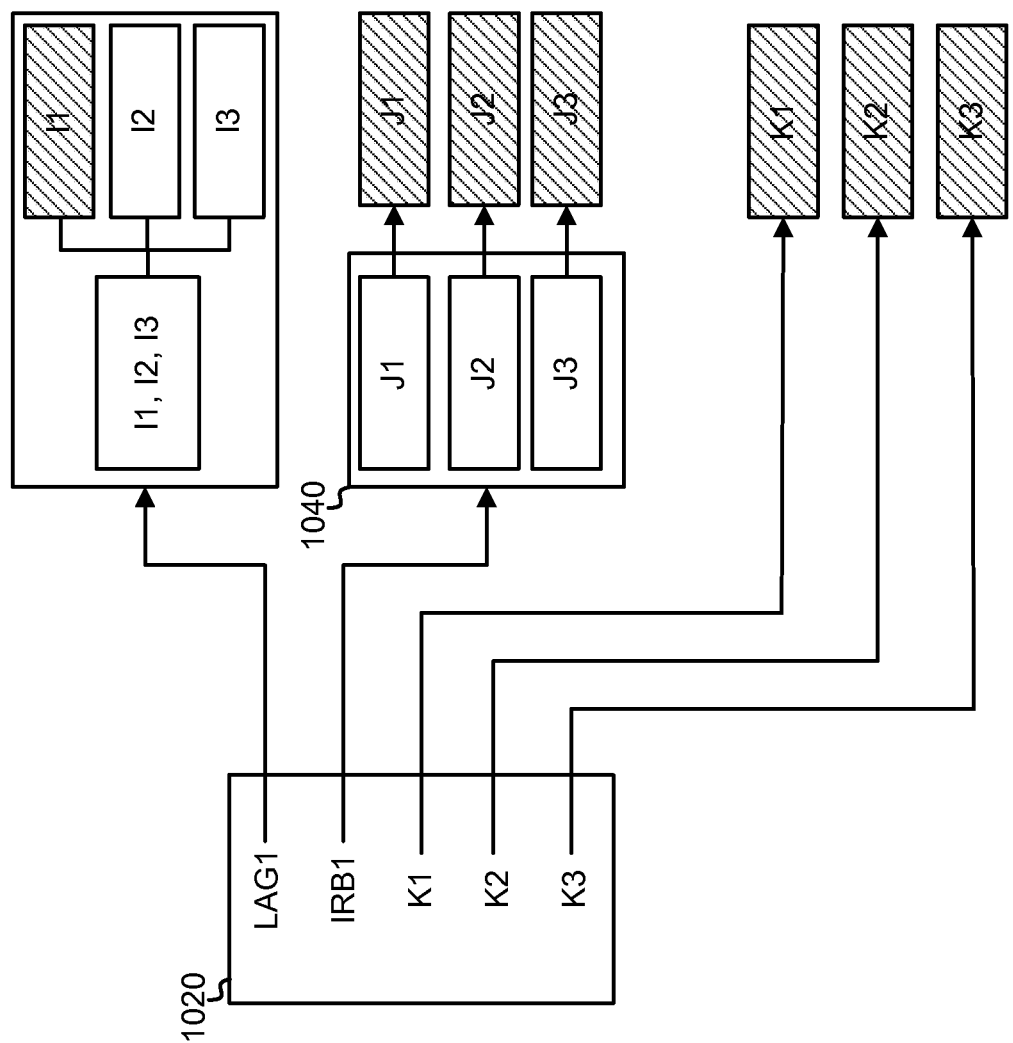
FIG. 10 is a diagram conceptually illustrating processing of a set of interfaces by an egress forwarding engine that includes integrated routing and bridging (IRB)

FIG. 10 is a diagram conceptually illustrating processing of a set of interfaces by an egress PFE that includes IRB. Assume that the set of interfaces, set of interfaces 1020, are received from interface lookup component 710 and include the interfaces: LAG1, IRB1, k1, k2, and k3. Assume, in FIG. 10, that the egress PFE includes each of the interfaces i1, i2, i3, j1, j2, j3, k1, k2, and k3.

As shown in FIG. 10, set of interfaces 1020, in addition to including references to LAGs and "normal" interfaces, may also include a reference to IRB, labeled as IRB1. IRB1 may refer to another set of interfaces, set of interfaces 1040. The data unit may be transmitted on each of these interfaces. Interfaces over which the data unit will be transmitted are shown shaded in FIG. 10. As shown, the egress PFE may transmit the data unit at one interface for LAG1 (e.g., the selected member interface i1), each of the IRB interfaces (j1, j2, and j3) and each of interfaces k1, k2, and k3.

Processing at the ingress PFE for an IRB interface may be similar to that for LAG interfaces. That is, PFE mask 325 may be set so that a bit is set for each PFE corresponding to each IRB member interface.

In some implementations, member interfaces for IRB may include a LAG interface. In this situation, another layer of indirection may be used in which the LAG interface of the IRB refers to a selector.

Figure 11:
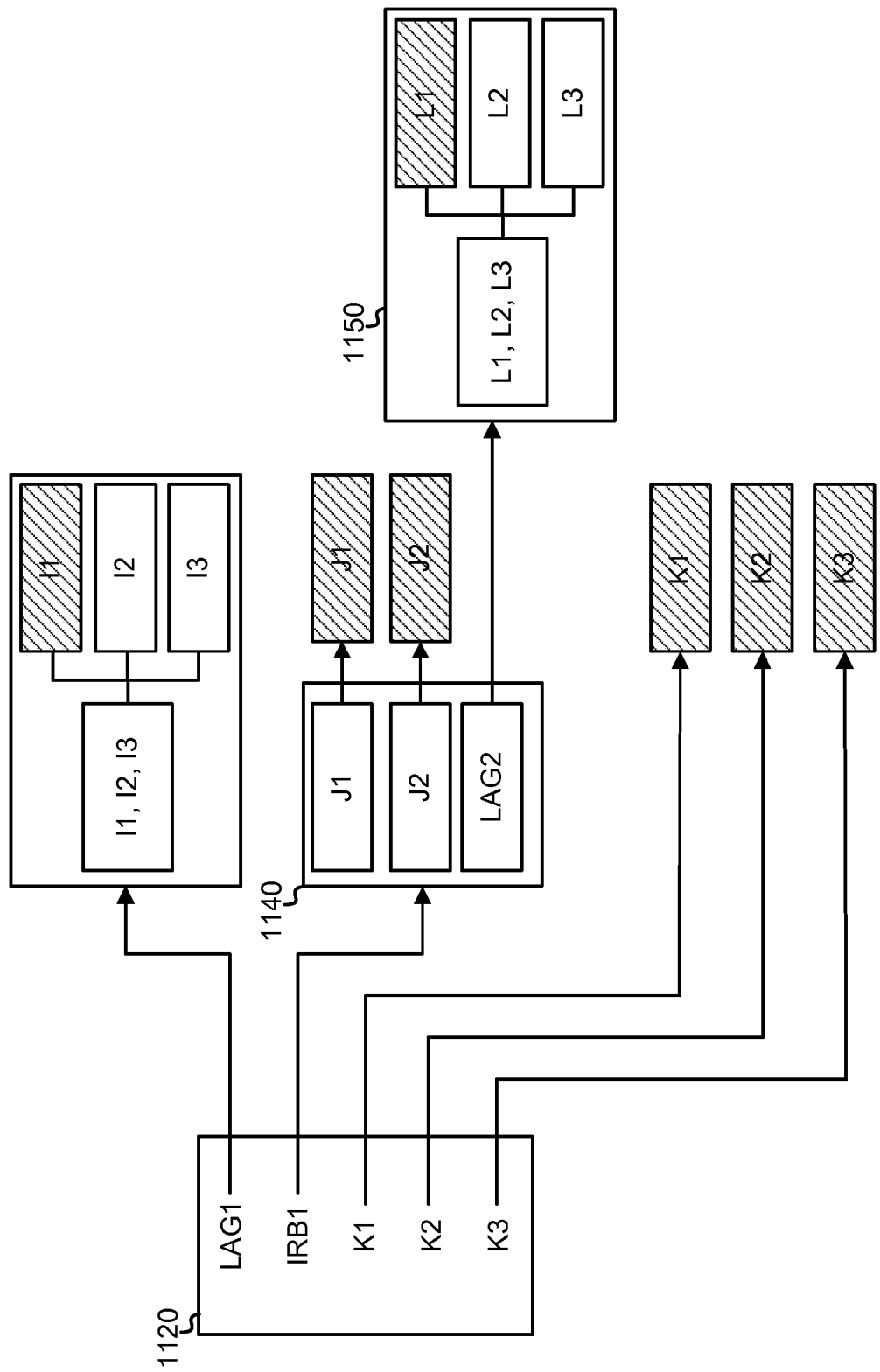
FIG. 11 is a diagram conceptually illustrating processing of a set of interfaces by an egress forwarding engine that includes an IRB interface in which a member of the IRB is a LAG.

FIG. 11 is a diagram conceptually illustrating processing of a set of interfaces by an egress PFE that includes an IRB interface in which a member of the IRB is a LAG. Assume that the set of interfaces, set of interfaces 1120, are received from interface lookup component 710 and include the interfaces: LAG1, IRB, k1, k2, and k3. Assume, in FIG. 11, that the egress PFE includes each of the interfaces i1, i2, i3, j1, j2, k1, k2, k3, l1, l2, and l3. Further, assume i1, i2, and i3 are member interfaces of LAG1 and l1, l2, and l3 are member interfaces of LAG2.

As shown in FIG. 11, set of interfaces 1120, in addition to including references to LAGs and "normal" interfaces, may also include a reference to IRB, labeled as IRB1. IRB1 may refer to another set of interfaces, set of interfaces 1140. Set of interfaces 1140 includes a reference to LAG2. LAG2 may refer to a selector, selector 1150, which may select a single member interface from the LAG member interfaces L1, L2, and L3. In the example shown, member interface L1 is selected.

In some implementations, a router may implement IGMP (Internet Group Management Protocol) snooping in order to more efficiently implement the IGMP protocol. With IGMP snooping enabled, router 140 may examine ("snoop") IGMP control data traffic to determine which L2 interfaces of router 140 should not be flooded with multicast data units. In such a situation, the containing interfaces for IRB can be determined based on the operation of the IGMP snooping.

Forwarding multicast data units over IRB using hierarchical set of interfaces, as described above, can provide a number of advantageous. For instance, when the bride-domain membership of the IRB changes, the lookup table implemented by interface lookup component 710 does not need to be modified, potentially leading to faster device convergence during membership changes of the bridge domain. This can be particularly true when one of the members corresponding to the IRB is a LAG.

CONCLUSION

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A network device comprising:
   a first forwarding component, at least partially implemented in hardware, to:
   generate a token that represents information identifying a route for a data unit; and
   transmit the token, and
   a second forwarding component, at least partially implemented in the hardware, that includes one or more engines to:
   lookup, based on the token, the information identifying the route for the data unit,
   the information identifying the route including:
   a first representation of a logical aggregated link (LAG) that corresponds to a plurality of member interfaces, and
   a second representation of a plurality of non-LAG interfaces;
   select, after looking up the information identifying the route, a single interface from the plurality of member interfaces corresponding to the LAG; and
   transmit the data unit via the single interface and one or more of the plurality of non-LAG interfaces.

2. The network device of claim 1,
   where the plurality of non-LAG interfaces include an integrated routing and bridging (IRB) interface,
   where the IRB interface corresponds to two or more different interfaces, and
   where, when transmitting the data unit, the one or more engines are further to:
   transmit the data unit via the two or more different interfaces.

3. The network device of claim 2,
   where one of the two or more different interfaces corresponds to a different LAG,
   where the different LAG corresponds to other member interfaces, and where, when transmitting the data unit via the two or more different interfaces, the one or more engines are to:
  select a different single interface from the other member interfaces, and
  transmit the data unit via the different single interface and via other ones of the two or more different interfaces that do not correspond to the different LAG.

4. The network device of claim 1, further comprising:
a switching component coupled to the first forwarding component and the second forwarding component,
  the switching component implementing a non-blocking switch that connects the first forwarding component and the second forwarding component.

5. The network device of claim 1,
where the first forwarding component is further to:
  generate a mask that defines which of a plurality of forwarding components are relevant to the route,
where the plurality of forwarding components include the first forwarding component, the second forwarding component, and one or more other forwarding components, and
where, when transmitting the token, the first forwarding component is to:
  transmit, based on the mask, the token to the second forwarding component and to one or more of the one or more other forwarding components.

6. The network device of claim 1, where, when generating the token, the first forwarding component is to:
  generate the token based on a longest prefix match of the data unit.

7. The network device of claim 1, where, when selecting the single interface, the one or more engines are to:
  select the single interface, from the plurality of member interfaces corresponding to the LAG, based on a hash function performed on one or more portions of the data unit.

8. A method comprising:
generating, by a network device, a token that represents a route for a multicast data unit;
transmitting, by the network device, the token to one or more different components of the network device that are relevant to the route;
determining, by the network device and based on the token, information identifying the route for the multicast data unit,
  the information identifying the route representing one or more non-aggregated physical interfaces and a logical aggregated link (LAG), and
  the LAG corresponding to a plurality of member interfaces;
selecting, by the network device and after determining the information identifying the route, a single interface from the plurality of member interfaces of the LAG; and
transmitting, by the network device, copies of the multicast data unit via the single interface and at least one of the one or more non-aggregated physical interfaces.

9. The method of claim 8, where selecting the single interface includes:
  selecting the single interface from the plurality of member interfaces of the LAG based on a hash function performed on one or more portions of the multicast data unit.

10. The method of claim 8,
where the information identifying the route further represents an integrated bridging and routing (IRB) interface, and where transmitting the copies of the multicast data unit includes:
  selecting a plurality of physical interfaces that correspond to the IRB interface, and
  transmitting one or more of the copies of the multicast data unit via the plurality of physical interfaces.

11. The method of claim 8, further comprising:
generating a mask corresponding to the token,
  transmitting the token to the one or more different components including:
    transmitting the token to the one or more different components based on the mask.

12. The method of claim 8, where generating the token includes:
  generating the token based on a longest prefix match of the multicast data unit.

13. A system comprising:
a device to:
  determine information identifying a route for a data unit,
    the information identifying the route representing a logical aggregated link (LAG) and an integrated bridging and routing (IRB) interface;
  generate a token representing the route; and
  transmit the token to one or more forwarding components of the device,
    a particular forwarding component, of the one or more forwarding components, being to
      select, based on the token, a single physical interface from member interfaces corresponding to the LAG;
      determine, based on the token, one or more other physical interfaces corresponding to the IRB interface; and
      transmit copies of the data unit based on the single physical interface and the one or more other physical interfaces.

14. The system of claim 13, where, when selecting the single physical interface, the particular forwarding component is to:
  select the single physical interface, from the member interfaces of the LAG, based on the token and a hash function applied to portions of the data unit.

15. The system of claim 13, where the device includes a router.

16. The method of claim 8,
where the information identifying the route further represents an integrated routing and bridging (IRB) interface,
where the IRB interface corresponds to a different LAG,
where the different LAG corresponds to other member interfaces, and
where the method further comprises:
  selecting a different single interface from the other member interfaces, and
  transmitting another copy of the data unit via the different single interface.

17. The system of claim 13,
where the IRB interface corresponds to a different LAG,
where the different LAG corresponds to other member interfaces, and
where the particular forwarding component is further to:
  select a different single physical interface from the other member interfaces, and
  transmit another copy of the data unit via the different single physical interface.

18. The system of claim 13, where the device is further to:
determine that the token is not in a lookup table associated with the device; and update the lookup table to reflect the LAG and the IRB interface after determining that the token is not in the lookup table.

19. The system of claim 13, where, when generating the token, the device is to:
generate the token based on a longest prefix match of the data unit.

20. The system of claim 13, where, when generating the token, the device is to:
generate a mask that defines that the one or more forwarding components are relevant to the route, and
transmit the token to one or more forwarding components based on the mask.

* * * * *